(12) United States Patent
von Benten

(10) Patent No.: US 8,119,718 B2
(45) Date of Patent: Feb. 21, 2012

(54) THERMALLY CONDUCTIVE POLYAMIDES WITH DIATOMACEOUS EARTH

(75) Inventor: Rebekka von Benten, Ludwigshafen (DE)

(73) Assignee: BASF SE, Ludwigashafen (DE)

( * ) Notice: Subject to any disclaimer, the term of this patent is extended or adjusted under 35 U.S.C. 154(b) by 0 days.

(21) Appl. No.: 13/001,245

(22) PCT Filed: Jun. 19, 2009

(86) PCT No.: PCT/EP2009/057665
§ 371 (c)(1),
(2), (4) Date: Dec. 23, 2010

(87) PCT Pub. No.: WO2009/156342
PCT Pub. Date: Dec. 30, 2009

(65) Prior Publication Data
US 2011/0172341 A1 Jul. 14, 2011

(30) Foreign Application Priority Data
Jun. 27, 2008 (EP) .................... 08159147

(51) Int. Cl.
*C08K 3/22* (2006.01)
*C08K 3/34* (2006.01)
(52) U.S. Cl. .................. 524/430; 524/437; 524/448
(58) Field of Classification Search .................. 524/430, 524/448
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 4,148,846 A | 4/1979 | Owens et al. |
| 4,360,617 A | 11/1982 | Muller et al. |
| 4,396,742 A | 8/1983 | Binsack et al. |
| 4,537,949 A | 8/1985 | Schmidt et al. |
| 4,540,772 A | 9/1985 | Pipper et al. |
| 4,771,109 A | 9/1988 | Eichenauer et al. |
| 4,882,381 A | 11/1989 | Wittmann et al. |
| 5,010,135 A | 4/1991 | Eckel et al. |
| 5,298,595 A | 3/1994 | Reimann et al. |

FOREIGN PATENT DOCUMENTS

| | | |
|---|---|---|
| DE | 2702661 A1 | 8/1977 |
| DE | 3725576 A1 | 2/1989 |
| DE | 3800603 A1 | 7/1989 |
| DE | 19607650 A1 | 9/1997 |
| DE | 10313681 A1 | 10/2004 |
| EP | 0038094 A2 | 10/1981 |
| EP | 0038582 A2 | 10/1981 |
| EP | 0039524 A1 | 11/1981 |
| EP | 50265 A1 | 4/1982 |
| EP | 129195 A2 | 12/1984 |
| EP | 129196 A2 | 12/1984 |
| EP | 208187 | 1/1987 |
| EP | 235690 A2 | 9/1987 |
| EP | 299444 A2 | 1/1989 |
| EP | 319290 A2 | 6/1989 |
| EP | 922065 A2 | 6/1999 |
| EP | 1198491 A1 | 4/2002 |
| WO | WO-98/08889 A2 | 3/1998 |
| WO | WO-01/09224 A1 | 2/2001 |
| WO | WO-2006/036151 A1 | 4/2006 |
| WO | WO-2007/113116 A1 | 10/2007 |

OTHER PUBLICATIONS

PCT International Preliminary Report on Patentability (Chapter I) for International application PCT/EP2009/057665 issued Jan. 5, 2011, and English-language translation thereof.

*Primary Examiner* — Peter Szekely
(74) *Attorney, Agent, or Firm* — Connolly Bove Lodge & Hutz LLP

(57) ABSTRACT

The present invention relates to thermoplastic molding compositions, comprising
A) from 19.9 to 69.99% by weight of a thermoplastic polyamide
B) from 30 to 80% by weight of an aluminum oxide
C) from 0.01 to 30% by weight of diatomaceous earth
D) from 0 to 30% by weight of further additives,
where the total of the percentages by weight of A) to D) is 100%.

20 Claims, No Drawings

THERMALLY CONDUCTIVE POLYAMIDES WITH DIATOMACEOUS EARTH

CROSS REFERENCE TO RELATED APPLICATIONS

This application is a national stage application under 35 U.S.C. §371 of PCT/EP2009/057665, filed Jun. 19, 2009, which claims benefit to European application 08159147.1, filed Jun. 27, 2008, the entire disclosures of which are hereby incorporated by reference.

DESCRIPTION

The invention relates to thermoplastic molding compositions, comprising
A) from 19.9 to 69.99% by weight of a thermoplastic polyamide
B) from 30 to 80% by weight of an aluminum oxide
C) from 0.01 to 30% by weight of diatomaceous earth
D) from 0 to 30% by weight of further additives,
where the total of the percentages by weight of A) to D) is 100%.

The invention further relates to the use of the molding compositions of the invention for the production of fibers, of foils, or of moldings of any type, and also to the resultant moldings.

It is known that the thermal conductivity (TC) of polymers can be increased via addition of mineral fillers or of metallic fillers. In order to achieve significant effects, addition of large amounts of filler is necessary, and this has a disadvantageous effect on the processability of the composites and on the mechanical properties and the surface quality of the moldings obtainable therefrom.

The use of diatomaceous earths in plastics, for example to achieve a matt effect, or as antiblocking agents for foils, is known by way of example from RÖMPP's on-line encyclopedia, electronic version 3.0.

It was therefore an object of the present invention to provide molding compositions which have good processability and which can be processed to give moldings with improved thermal conductivity and with good mechanical properties (in particular toughness).

Accordingly, the molding compositions defined in the introduction have been found. The subclaims give preferred embodiments.

The molding compositions of the invention comprise, as component A), from 19.99 to 69.99% by weight, preferably from 20 to 59% by weight, and in particular from 27 to 45% by weight, of at least one polyamide.

The intrinsic viscosity of the polyamides of the molding compositions of the invention is generally from 70 to 350 ml/g, preferably from 70 to 170 ml/g, determined in a 0.5% strength by weight solution in 96% strength by weight sulfuric acid at 25° C. to ISO 307.

Preference is given to semicrystalline or amorphous resins whose molecular weight (weight-average value) is at least 5000, for example those described in the following U.S. Pat. Nos. 2,071,250, 2,071,251, 2,130,523, 2,130,948, 2,241,322, 2,312,966, 2,512,606, and 3,393,210.

Examples of these are polyamides derived from lactams having from 7 to 13 ring members, examples being polycaprolactam, polycaprylolactam, and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here merely as examples are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylene-sebacamide and polycaprolactam, and also nylon-6/6,6 copolyamides, in particular having a proportion of from 5 to 95% by weight of caprolactam units.

Other suitable polyamides are obtainable from ω-aminoalkyl nitriles, e.g. amino-capronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio.

Other polyamides which have proven particularly advantageous are semiaromatic copolyamides, such as PA 6/6T and PA 66/6T, where the triamine content of these is less than 0.5% by weight, preferably less than 0.3% by weight (see EP-A 299 444).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers present:

| AB polymers: | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers: | |
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA MXD6 | m-Xylylenediamine, adipic acid |
| AA/BB polymers: | |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |

-continued

| | |
|---|---|
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

According to the invention, the thermoplastic molding compositions comprise, as component B), from 30 to 80% by weight of an Al oxide. The proportion of B) in the molding compositions of the invention is preferably from 40 to 70% by weight, and in particular from 50 to 60% by weight.

The aspect ratio of suitable oxides is preferably smaller than 10, with preference smaller than 7.5, and in particular smaller than 5.

The preferred average particle diameter ($d_{50}$) is from 0.2 to 20 μm, preferably from 0.3 to 15 μm, and in particular from 0.35 to 10 μm, according to laser granulometry to ISO 13320-1.

Products of this type are obtainable commercially by way of example from Almatis.

A $d_{50}$ value is generally understood by the person skilled in the art to be that particle size value (particle diameter) which is smaller than the size of 50% of the particles and greater than the size of 50% of the particles.

The $d_{10}$ value is preferably smaller than 10 μm, in particular smaller than 5 μm, and very particularly preferably smaller than 2.2 μm.

Preferred $d_{90}$ values are smaller than 50 μm, and in particular smaller than 30 μm, and very particularly preferably smaller than 30 μm.

Aluminum oxides (aluminas), $Al_2O_3$, MW 101.96. The oxides occur in various forms, of which the hexagonal α-oxide is the sole form having thermodynamic stability. The cubic face-centered form, $\gamma$-$Al_2O_3$, has also been well characterized. It is produced from aluminum hydroxides via heating to from 400-800° C. and, like the other forms, can be converted into α-$Al_2O_3$ via heating above 1100°. β-$Al_2O_3$ is a group of oxides whose crystal lattice comprises small amounts of foreign ions. Other forms are of relatively little importance, and this also applies to the numerous transitional forms between aluminum hydroxides and these two forms. Preference is given to α-$Al_2O_3$, density 3.98, hardness 9, melting point 2053° C., which is insoluble in water, acids, and bases. α-$Al_2O_3$ is obtained industrially from bauxite by the Bayer process. It is mostly used for the electrolytic production of aluminum. The oxides occur as a thin protective layer on aluminum; this oxide layer can be reinforced via chemical or anodic oxidation.

α-$Al_2O_3$ occurs naturally as corundum, melting point 2050° C. Corundum is mostly opaque because of impurities, and also often has a color. Corundum is nowadays obtained industrially in the form of electrocorundum; here, $Al_2O_3$ obtained from bauxite is melted at above 2000° C. in an electric arc furnace. This gives a very hard product with about 99% of α-$Al_2O_3$.

The materials known as the active oxides are produced via precipitation processes from aluminum salt solution—for example by way of thermally post-treated aluminum hydroxide gels—or via calcination from α-aluminum hydroxide at low temperatures, or via flash heating.

The BET specific surface area (to ISO 9277) of component B) is preferably <12 m²/g, and with preference at least 0.1 m²/g, and preferably at least 0.3 m²/g.

The preferred density is from 2.5 to 4.5 g/cm³, in particular from 3.9 to 4.0 g/cm³.

Sodium oxide content is preferably less than 0.4% by weight, in particular from 0.01 to 0.35% by weight, based on 100% by weight of B).

Thermal conductivity to DIN 52612 is preferably at least 20 W/mK, and in particular at least 25 W/mK.

The molding compositions of the invention comprise, as component C), from 0.01 to 30% by weight, preferably from 1 to 20% by weight, and in particular from 5 to 15% by weight, of diatomaceous earth (also often termed infusorial earth, fossil flour, kieselguhr, or terra silicea).

This is a very fine-grained, loose-packed, low-density, chalk-like, siliceous geological sediment, mostly white to pale gray. Kieselguhr is composed of the variously shaped silica skeletons of microscopic diatoms, which since the Triassic period have lived in fresh, brackish, and salt water. The skeletons have many very fine grooves, indentations, channels, etc.; this explains the low density (kieselguhr floats in water), the high absorbency, the good filter action, and the low thermal conductivity and low acoustic conductivity. For use as filler, kieselguhr is mostly calcined, and is also flux-calcined with alkalis to improve lightness of color. The table gives the constitution of dried, fired, and flux-calcined kieselguhr, and preference is given here to flux-calcined kieselguhr.

TABLE

| | dried | calcined | flux-calcined |
|---|---|---|---|
| $SiO_2$ | 72-88 | 88-92 | 86-95 |
| $Al_2O_3$ | <0.9-8.5 | <1.0-8.7 | <1.0-8.6 |
| $Fe_2O_3$ | 1.5-3.0 | 1.5-3.2 | <1.5-3.0 |
| CaO | 0.8-2.0 | 0.8-2.0 | 0.8-2.7 |
| $Na_2O/K_2O$ | — | — | to 3 |
| Loss on calcination | 4-6 | — | — |

The bulk density of the powder is usually from 0.15-0.3 g/cm³. Kieselguhr is composed of biogenic amorphous opal-A and crystalline opal-CT (alternating layers of cristobalite, tridymite, and forms of quartz; cf. opal), from 3-12% of water, and some organic admixtures (e.g. bitumen). Some chemical analyses (cf. table) give only low contents of iron, aluminum, calcium, magnesium, manganese, titanium, sodium, potassium, phosphorus, and sulfur. Kieselguhr is fire-resistant and non-electrically-conductive, and has high chemicals resistance, e.g. with respect to acids with the exception of hydrofluoric acid, but is attacked by alkalis.

Kieselguhr occurs widely where a sufficient supply of dissolved silicon dioxide is available for the large-scale growth of diatoms necessary for formation of geological deposits. Most geological deposits are found in relatively recent (Tertiary to Recent) areas of vulcanicity, e.g. Myvatn Lake, Iceland (recent diatomite formation due to inflow of geothermal water, diatomites being solidified diatomaceous slurries), and in Murat and elsewhere in the Auvergne, France, and at a number of localities in Spain, and also in Nevada, Oregon and Washington, USA. It also occurs in Germany, in the Lüneburger Heide (formed in lakes during two interglacials; extraction ceased in 1994), and in Sachsen-Anhalt. The material extracted in Denmark is known as moler earth. Like the Lompoc deposits in California (largest kieselguhr deposits in the world), the Danish deposits owe their origin to loose glassy volcanic material rich in silicon dioxide carried by the wind into lake basins or coastal basins. There are also large deposits in China and Japan.

Kieselguhr is generally extracted by open-cast mining; treatment comprises slurrying (removal of sand, humus, and the like), drying, calcination, grinding, and sieving. Because the skeleton of the diatoms is fragile, the main operation used particularly for production of filter kieselguhr is air sifting, in a current of hot air.

The ($d_{50}$) value of preferred components C) is from 0.2 to 20 µm, preferably from 1 to 15 µm, and in particular from 5 to 15 µm (measured to ISO 13320-1 by means of laser granulometry).

The BET surface area is preferably smaller than or equal to 80 m²/g, preferably from 1 to 20 m²/g (to ISO 9277).

The diatomaceous earths C) can have been surface-pretreated with a silane compound to improve compatibility with the thermoplastic.

Suitable silane compounds have the general formula:

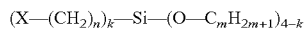

where:
X is

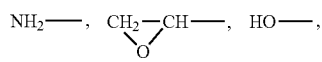

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.6 to 1.0% by weight (based on 100% by weight of C)).

The molding compositions of the invention can comprise, as components D), from 0 to 30% by weight, preferably up to 20% by weight, of further additives.

The molding compositions of the invention can comprise, as component D), from 0 to 3% by weight, preferably from 0.05 to 3% by weight, with preference from 0.1 to 1.5% by weight, and in particular from 0.1 to 1% by weight of a lubricant.

Preference is given to the Al, alkali metal, or alkaline earth metal salts, or esters or amides of fatty acids having from 10 to 44 carbon atoms, preferably having from 14 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol or n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The inventive molding compositions can comprise, as other components D), heat stabilizers or antioxidants, or a mixture of these, selected from the group of the copper compounds, sterically hindered phenols, sterically hindered aliphatic amines, and/or aromatic amines.

The inventive molding compositions comprise from 0.05 to 3% by weight, preferably from 0.1 to 1.5% by weight, and in particular from 0.1 to 1% by weight, of copper compounds, preferably in the form of Cu(I) halide, in particular in a mixture with an alkali metal halide, preferably KI, in particular in the ratio 1:4, or of a sterically hindered phenol or of an amine stabilizer, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols are in principle any of the compounds having a phenolic structure and having at least one bulky group on the phenolic ring.

By way of preferred example, compounds of the formula can be used, in which:

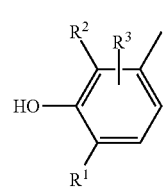

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

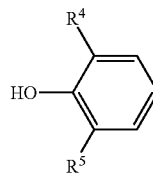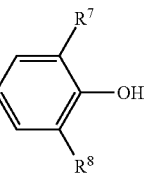

where $R^4$, $R^5$, $R^2$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

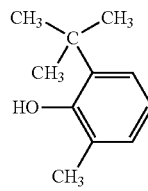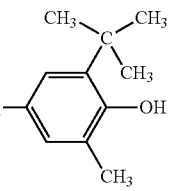

(Irganox® 245 from Ciba-Geigy)

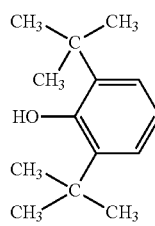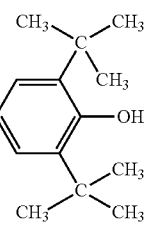

(Irganox® 259 from Ciba-Geigy)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxy-phenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis[3,5-di-tert-butyl-4-hydroxyphenyl]propionate (Irganox® 259), pentaerythrityl tetrakis[3-(3,5-di-tert-butyl-4-hydroxyphenyl)propionate], and also N,N'-hexamethylene-bis-3,5-di-tert-butyl-4-hydroxyhydrocinnamide (Irganox® 1098), and the product Irganox® 245 described above from Ciba Geigy, which has particularly good suitability.

The material comprises amounts of from 0.05 to 3% by weight, preferably from 0.1 to 1.5% by weight, in particular from 0.1 to 1% by weight, based on the total weight of the molding compositions A) to E), of the phenolic antioxidants, which may be used individually or in the form of a mixture.

In some instances, sterically hindered phenols having not more than one sterically hindered group in ortho-position with respect to the phenolic hydroxy group have proven particularly advantageous; in particular when assessing color-fastness on storage in diffuse light over prolonged periods.

The inventive molding compositions can comprise from 0 to 3% by weight, preferably from 0.01 to 2% by weight, of the aminic stabilizers, with preference from 0.05 to 1.5% by weight of an amine stabilizer. Sterically hindered amine compounds have preferred suitability. Examples of compounds that can be used are those of the formula

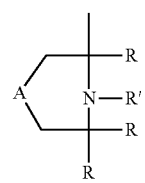

where

R are identical or different alkyl radicals,

R' is hydrogen or an alkyl radical, and

A is an optionally substituted 2- or 3-membered alkylene chain.

Preferred components are derivatives of 2,2,6,6-tetramethylpiperidine, such as:

4-acetoxy-2,2,6,6-tetramethylpiperidine,
4-stearoyloxy-2,2,6,6-tetramethylpiperidine,
4-aryloyloxy-2,2,6,6-tetramethylpiperidine,
4-methoxy-2,2,6,6-tetramethylpiperidine,
4-benzoyloxy-2,2,6,6-tetramethylpiperidine,
4-cyclohexyloxy-2,2,6,6-tetramethylpiperidine,
4-phenoxy-2,2,6,6-tetramethylpiperidine,
4-benzoxy-2,2,6,6-tetramethylpiperidine,
4-(phenylcarbamoyloxy)-2,2,6,6-tetramethylpiperidine.

Other suitable compounds are
bis(2,2,6,6-tetramethyl-4-piperidyl) oxalate,
bis(2,2,6,6-tetramethyl-4-piperidyl) malonate,
bis(2,2,6,6-tetramethyl-4-piperidyl) adipate,
bis(1,2,2,6,6-pentamethylpiperidyl) sebacate,
bis(2,2,6,6-tetramethyl-4-piperidyl) terephthalate,
1,2-bis(2,2,6,6-tetramethyl-4-piperidyloxy)ethane,
bis(2,2,6,6-tetramethyl-4-piperidyl)hexamethylene 1,6-dicarbamate,
bis(1-methyl-2,2,6,6-tetramethyl-4-dipiperidyl) adipate, and
tris(2,2,6,6-tetramethyl-4-piperidyl)benzene-1,3,5-tricarboxylate.

Other suitable compounds are moreover relatively high-molecular-weight piperidine derivatives, such as the dimethyl succinate polymer with 4-hydroxy-2,2,6,6-tetramethyl-7-piperidinylethanol, or poly-6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-14-piperidinyl)imino, these having particularly good suitability, as also has bis(2,2,6,6-tetramethyl-4-piperidyl) sebacate.

Compounds of this type are commercially available with the name Tinuvin® or Chimasorb® (registered trademark of Ciba Spezialitätenchemie GmbH).

Another particularly preferred amine compound that may be mentioned is Uvinul® 4049 H from BASF SE:

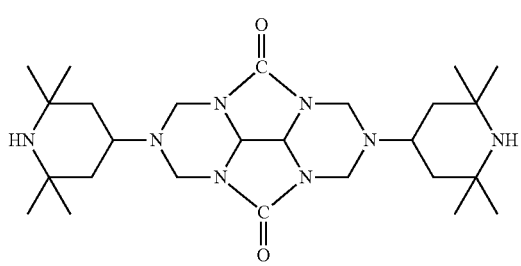

Other particularly preferred examples of stabilizers that can be used according to the invention are those based on secondary aromatic amines, e.g. adducts derived from phenylenediamine with acetone (Naugard® A), adducts derived from phenylene-diamine with linolene, Naugard® 445 (II), N,N'-dinaphthyl-p-phenylenediamine (III), N-phenyl-N'-cyclohexyl-p-phenylenediamine (IV), or a mixture of two or more of these

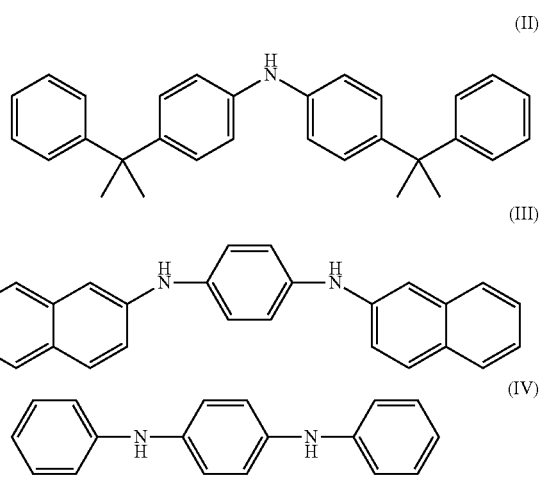

Other conventional additives D), by way of example, are amounts of up to 10% by weight, preferably from 1 to 5% by weight, of elastomeric polymers (also often termed impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2.6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These dicarboxylic acid derivatives or monomers comprising epoxy groups are preferably incorporated into the rubber by adding, to the monomer mixture, monomers comprising dicarboxylic acid groups and/or epoxy groups and having the general formulae I, II, III or IV

 (I)

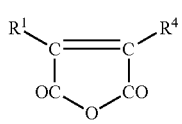 (II)

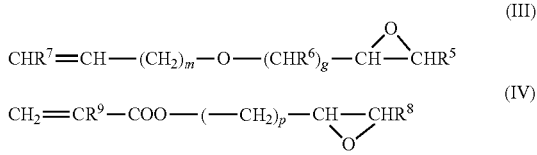 (III)

(IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be produced by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible here to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

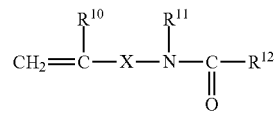

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_8$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

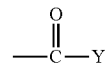

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of, graft polymers with a core and with at least one outer shell, and having the following structure:

| Type | Monomers for the core | Monomers for the envelope |
|------|----------------------|---------------------------|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the above-mentioned copolymers, and copolymers of ethylene with comonomers which supply reactive groups.

The elastomers described may also be produced by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers D) which may be mentioned are carbon fibers, glass fibers, glass beads, amorphous silica, calcium silicate, calcium metasilicate, magnesium carbonate, kaolin, chalk, powdered quartz, mica, barium sulfate and feldspar, used in amounts of up to 20% by weight, in particular from 1 to 15% by weight.

Preferred fibrous fillers that may be mentioned are carbon fibers, aramid fibers, and potassium titanate fibers, particular preference being given here to glass fibers in the form of E glass. These can be used in the form of rovings or chopped glass in the commercially available forms.

The fibrous fillers can have been surface-pretreated with a silane compound to improve compatibility with the thermoplastic.

Suitable silane compounds have the general formula:

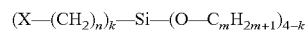

where:
X is

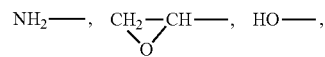

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight, and in particular from 0.05 to 0.5% by weight (based on the fibrous fillers).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The thermoplastic molding compositions of the invention may comprise, as further components D), usual processing aids, such as stabilizers, oxidation retarders, further agents to counteract decomposition due to heat and decomposition due to ultraviolet light, lubricants and mold-release agents, colorants, such as dyes and pigments, nucleating agents, plasticizers, flame retardants, etc.

Examples which may be mentioned of oxidation retarders and heat stabilizers are phosphites and other amines (e.g. TAD), hydroquinones, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black and/or graphite, and also organic pigments, such as phthalocyanines, quinacridones and perylenes, and also dyes, such as nigrosin and anthraquinones.

Nucleating agents which may be used are sodium phenylphosphinate, alumina, silica, and preferably talc.

The inventive thermoplastic molding compositions may be produced by methods known per se, by mixing the starting components in conventional mixing apparatus, such as screw extruders, Brabender mixers or Banbury mixers, and then extruding them. The extrudate may then be cooled and comminuted. It is also possible to premix individual components and then to add the remaining starting materials individually and/or likewise in a mixture. The mixing temperatures are generally from 230 to 320° C.

In another preferred procedure, components B) and C), and also, if appropriate, D) can be mixed with a prepolymer, compounded, and pelletized. The resultant pellets are then solid-phase condensed under an inert gas, continuously or batchwise, at a temperature below the melting point of component A) until the desired viscosity has been reached.

The inventive thermoplastic molding compositions feature good flowability together with good mechanical properties, and also markedly improved thermal conductivity.

They are suitable for the production of fibers, of foils, or of moldings of any type. A few preferred examples are mentioned below:

The molding compositions described are suitable for improving dissipation of heat from heat sources.

The heat dissipated can be power loss from electrical modules or else heat intentionally generated via heating elements.

Among electrical modules with power loss are, for example, CPUs, resistors, ICs, batteries, accumulators, motors, coils, relays, diodes, conductor tracks, etc.

Dissipation of the heat demands maximum effectiveness of contact between heat source and molding composition so that heat can be discharged from the source by way of the molding composition to the environment (gaseous, liquid, solid). In order to improve the quality of contact, it is also possible to use substances known as thermally conductive pastes. The best heat-removal function is obtained when the molding compositions are injected around the heat source.

The molding compositions are also suitable for production of heat exchangers. There is usually a relatively hot fluid (gaseous, liquid) passing through heat exchangers discharging and thus heat to a relatively cool medium (usually also gaseous or liquid) via a wall. Examples of these devices are heaters in homes or radiators in cars. With regard to the suitability of the molding compositions described for production of heat exchangers, no importance is attached to the direction in which heat is transported, and it is insignificant whether hot and/or cool medium is actively circulated or is subjected to free convection. However, the heat exchange between the media concerned is usually improved by active circulation, irrespective of the wall material used.

EXAMPLES

The following components were used:

Component A:

Nylon-6,6 whose intrinsic viscosity IV was 130 ml/g, measured on a 0.5% strength by weight solution in 96% strength by weight sulfuric acid at 25° C. to ISO 307 (the material used being Ultramid® A24 from BASF AG).

Component B:

CL4400 aluminum oxide, solids content: 99.8% of $Al_2O_3$, BET surface area: 0.6 $m^2$/g, $D_{50}$ 7 μm Component C/1:

A flux-calcined diatomaceous earth (Celite 499 from Alicante, Spain, supplied by World Minerals Inc.) with average particle size $d_{50}$ of 14 μm (measured by laser light scattering to ISO 13320-1), specific BET surface area of 2 $m^2$/g (determined to ISO 9277) and silicate content >95%.

Component C/2:

A flux-calcined diatomaceous earth (Celite 499 from Alicante, Spain, supplied by World Minerals Inc.) with average particle size $d_{50}$ of 14 μm (measured by laser light scattering to ISO 13320-1), specific BET surface area of 2 $m^2$/g (determined to ISO 9277) and silicate content >95%, surface-functionalized with 0.6% [m/m] of 3-aminopropyltriethoxysilane.

Aminosilane Coating of Component C/2:

To form silanol, 3-aminopropyltriethoxysilane (0.6 g per 100 g of diatomaceous earth) was used as initial charge in deionized water (250 ml per 100 g of diatomaceous earth), and stirred at room temperature for 30 min. The diatomaceous earth was added, and the suspension was stirred at 80° C. for 1 h, and the product was isolated in a suction filter and washed with deionized water. After drying for 5 h at 120° C., the coated diatomaceous earth was heat-conditioned at 200° C. for 30 min.

Component D:

A chopped glassfiber with filament diameter 10 μm and with a polyamide-compatible aminosilane size.

The molding compositions were produced in a ZSK 30 with throughput of 10 kg/h and with a flat temperature profile at about 280° C. Component B) was added at 2 metering points to the melt A).

The following tests were carried out:

Tensile test to ISO 527,

Impact resistance (Charpy): ISO 179-1 eU at 23° C.

IV: c=5 g/l in 96% strength sulfuric acid, to ISO 307

Thermal conductivity: laser flash method using LFA 447 from Netzsch, to

ASTM E1461,

BET to ISO 9277

$d_{50}/d_{90}$ via laser granulometry to ISO 13320-1.

The constitutions of the molding compositions and the results of the tests are found in the table.

|  | Example | | | |
| --- | --- | --- | --- | --- |
|  | 0/comp | 1/comp | 2 | 3 |
| Components [% by wt.] | | | | |
| A | 40 | 30 | 30 | 30 |
| B | 60 | 60 | 60 | 60 |
| C/1 |  |  | 10 |  |
| C/2 |  |  |  | 10 |
| D |  | 10 |  |  |
| Thermal conductivity [W/mK] | 1.1 | 1.3 | 1.6 | 1.5 |
| Modulus of elasticity [GPa] |  | 13.5 | 12.3 | 11.7 |
| Tensile strength [MPa] |  | 89 | 66.4 | 73.4 |
| Tensile strain at break [%] |  | 1.0 | 0.65 | 0.82 |
| Charpy impact resistance, without notch [kJ/m²] |  | 24.1 | 12.7 | 19.2 | comp = comparison

The invention claimed is:

1. A thermoplastic molding composition, comprising
A) from 19.9 to 69.99% by weight of a thermoplastic polyamide
B) from 30 to 80% by weight of an aluminum oxide
C) from 0.01 to 30% by weight of diatomaceous earth
D) from 0 to 30% by weight of further additives,
where the total of the percentages by weight of A) to D) is 100%.

2. The thermoplastic molding composition according to claim 1, in which component C) has been surface-pretreated with silanes.

3. The thermoplastic molding composition according to claim 1, where the aspect ratio of component B) is smaller than 10.

4. The thermoplastic molding composition according to claim 1, where the BET surface area to ISO 9277 of component B) is smaller than or equal to 12 m²/g.

5. The thermoplastic molding composition according to claim 1, where the average particle diameter ($d_{50}$) of component B) is from 0.2 to 20 μm (according to laser granulometry to ISO 13320-1).

6. The thermoplastic molding composition according to claim 1, in which component C) is flux-calcined diatomaceous earth.

7. The thermoplastic molding composition according to claim 1, where the average particle diameter (d50) of component C) is from 0.2 to 20 μm (measured using laser granulometry to ISO 13320-1).

8. The thermoplastic molding composition according to claim 1, where the BET surface area (to ISO 9277) of component C) is smaller than or equal to 80 m²/g.

9. The use of the thermoplastic molding compositions according to claim 1 for the production of fibers, of foils, or of moldings of any type.

10. A fiber, a foil, or a molding of any type obtainable from the thermoplastic molding compositions according to claim 1.

11. The thermoplastic molding composition according to claim 2, where the aspect ratio of component B) is smaller than 10.

12. The thermoplastic molding composition according to claim 2, where the BET surface area to ISO 9277 of component B) is smaller than or equal to 12 m²/g.

13. The thermoplastic molding composition according to claim 3, where the BET surface area to ISO 9277 of component B) is smaller than or equal to 12 m²/g.

14. The thermoplastic molding composition according to claim 2, where the average particle diameter ($d_{50}$) of component B) is from 0.2 to 20 μm (according to laser granulometry to ISO 13320-1).

15. The thermoplastic molding composition according to claim 3, where the average particle diameter ($d_{50}$) of component B) is from 0.2 to 20 μm (according to laser granulometry to ISO 13320-1).

16. The thermoplastic molding composition according to claim 4, where the average particle diameter ($d_{50}$) of component B) is from 0.2 to 20 μm (according to laser granulometry to ISO 13320-1).

17. The thermoplastic molding composition according to claim 2, in which component C) is flux-calcined diatomaceous earth.

18. The thermoplastic molding composition according to claim 3, in which component C) is flux-calcined diatomaceous earth.

19. The thermoplastic molding composition according to claim 4, in which component C) is flux-calcined diatomaceous earth.

20. The thermoplastic molding composition according to claim 5, in which component C) is flux-calcined diatomaceous earth.

* * * * *